US006730861B1

(12) United States Patent  (10) Patent No.: US 6,730,861 B1
Simons                     (45) Date of Patent:     May 4, 2004

(54) WEIGH SENSED LIFT TRUCK FORKS

(75) Inventor: Gerald S. Simons, Toronto (CA)

(73) Assignee: Weigh Point Incorporated, Cambridge (CA)

( * ) Notice: Subject to any disclaimer, the term of this patent is extended or adjusted under 35 U.S.C. 154(b) by 0 days.

(21) Appl. No.: 09/705,798

(22) Filed: Nov. 6, 2000

Related U.S. Application Data

(60) Provisional application No. 60/163,644, filed on Nov. 4, 1999.

(51) Int. Cl.[7] ............................................. G01G 19/08
(52) U.S. Cl. ...................... 177/136; 177/139; 177/141
(58) Field of Search ................................ 177/136, 139, 177/141, 140, 154, 155, 156

(56) References Cited

U.S. PATENT DOCUMENTS

| 4,420,053 A | * | 12/1983 | Russo ........................ 177/139 |
| 4,421,186 A |   | 12/1983 | Bradley |
| 4,638,876 A |   | 1/1987  | Baldwin et al. |
| 4,666,004 A | * | 5/1987  | Raz ............................ 177/139 |
| 4,714,122 A | * | 12/1987 | Appleton et al. ............ 177/139 |
| 4,854,406 A | * | 8/1989  | Appleton et al. ............ 177/139 |
| 4,899,840 A | * | 2/1990  | Boubille ...................... 177/139 |
| 5,417,536 A | * | 5/1995  | Cech ............................ 177/140 |
| 5,739,478 A |   | 4/1998  | Zefia |
| 5,837,946 A | * | 11/1998 | Johnson et al. ............. 177/136 |
| 5,861,580 A |   | 1/1999  | Moore et al. |
| 5,986,560 A | * | 11/1999 | Rayburn ...................... 177/136 |
| 6,002,090 A | * | 12/1999 | Johnson et al. ............. 177/136 |

* cited by examiner

Primary Examiner—Randy Gibson
(74) Attorney, Agent, or Firm—Hodgson Russ LLP

(57) ABSTRACT

Weigh sensed lift truck forks in which each standard fork is modified to accept an assembly including load sensing cells, spacers and a fork cover. Each cover provides protection for load cells affixed through spacers between the fork and fork cover, standard fork tip functionality and a load bearing surface and structure that interfaces through the spacers with the load cells and fork subassembly to provide accurate load weight data. The design of the components and method of their assembly result in improved manufacturing efficiency and cost effectiveness, easier installation, improved load weighing functionality, improved structural robustness, easier servicing and improved safety.

15 Claims, 4 Drawing Sheets

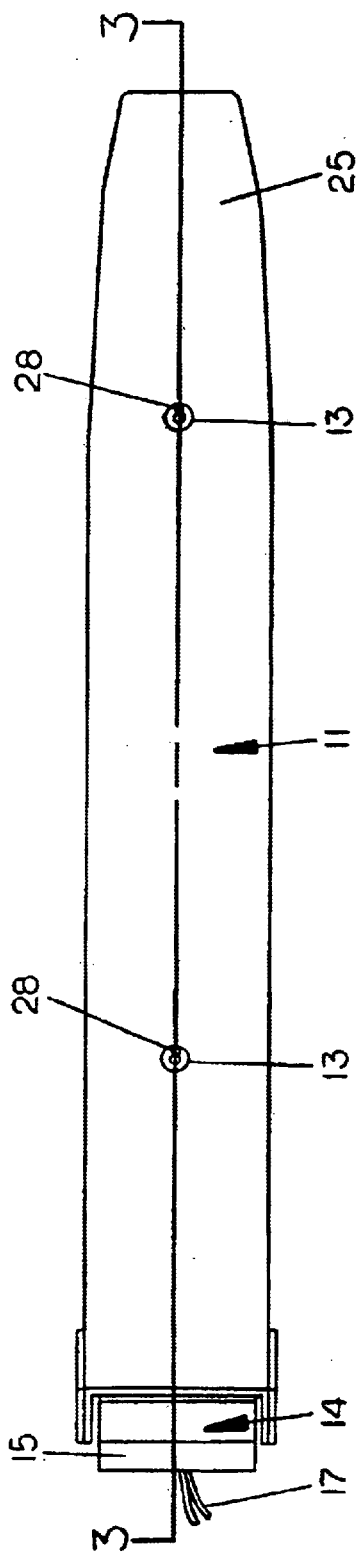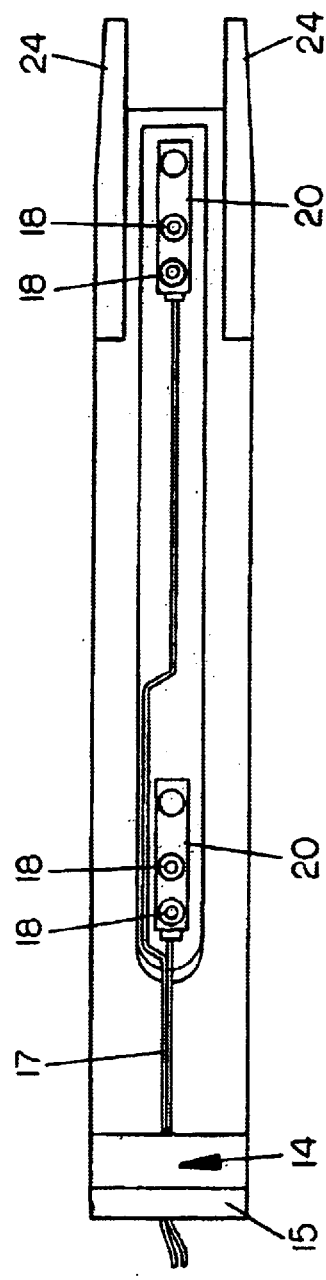

WEIGH SENSED LIFT TRUCK FORKS

CROSS-REFERENCE TO RELATED APPLICATIONS

Application Numbers 294,781; 591,470; 453,996; 783,760; Ser. No. 08/964,765; 492,739; 369,867.

STATEMENT REGARDING FEDERALLY SPONSERED RESEARCH OR DEVELOPMENT

Not Applicable

REFERENCE TO A MICROFICHE APPENDIX

Not Applicable

BACKGROUND OF THE INVENTION

The present invention relates in general to electrical/electronic weighing systems and more particularly to strain gauge load cells used on forklift trucks.

It is known that, in addition to typical lifting and transporting functions performed with forklift trucks and the like, weighing functions can also be carried out with this type of equipment when fitted with a weight measuring system. Various such systems have received patents and are being used. However, specific problems can and do arise with prior art systems with regard to carrying out lifting and weighing operations, manufacturing costs, installation and servicing.

Some systems require structural modifications or additional attachments to the lift truck, adding cost and resulting in more difficult and time consuming installation as evident in U.S. Pat's to Weigh-Tronix, U.S. Pat. Nos. 4,421,186 and 6,002,090.

Some systems are limited in ease of performing weighing functions in that they must be activated into the lift mode before weighing functions can be performed as evident in U.S. Pat. to Zefira, U.S. Pat. No. 5,739,478.

Some systems employ technically and physically elaborate approaches to address excessive vertical forces, lateral forces and binding in the weighing system that can cause inaccurate weight readings and damage to the load cells as evident in U.S. Pat's to Weigh-Tronix, U.S. Pat. Nos. 4,421,186 and 6,002,090.

Some systems use only a portion of the lifting surface for weighing, limiting load placement options, and employ partial shrouds or covers that do not extend over the entire fork and subassembly surface and will be prone to allowing foreign substances such as dirt and water that could cause false readings from the weigh system as evident in U.S. Pat. to Russo, U.S. Pat. No. 4,420,053.

Some systems employ mechanically elaborate designs, likely to be prone to mechanical malfunction and high manufacturing cost, to address weight measurement accuracy problems resulting from eccentric loads as evident in U.S. Pat. to Baldwin, U.S. Pat. No. 4,368,876.

Some system designs are not based on standard lift truck fork configurations and are thicker or higher in cross section or have component details that protrude above the general height of the fork lifting surface making it more difficult or impossible to slide the forks under a standard pallet as evident in U.S. Pat's to Boubille, U.S. Pat. No. 4,899,840 and S'More, Inc., U.S. Pat. No. 5,861,580. Further, systems not based on standard lift truck forks tend to require more custom manufactured components and complexity, usually resulting in higher manufacturing costs and requiring more highly skilled or knowledgeable service personnel respectively.

Some systems require additional weigh system attachment components such as a secondary carriage that can create a potentially unbalanced and unsafe condition because the position of the forks is moved forward relative to the lift truck resulting in incorrect load centers specified by the lift truck manufacturer as evident in U.S. Pat's to Weigh-Tronix, U.S. Pat. Nos. 4,421,186 and 6,002,090.

Some systems do not allow weighing functions to be performed with the lifting surface in the fully lowered position making it difficult or impossible to safely check load weight relative to the maximum lifting capacity of the lift truck before attempting to lift the load as evident in U.S. Pat. to Zefira, U.S. Pat. No. 5,739,478.

BRIEF SUMMARY OF THE INVENTION

A weighing apparatus, in particular weigh sensed lift truck forks for which the design is generally based on a standard lift truck fork. These forks are each modified to accept an assembly of load sensing cells and their wiring, spacers, fasteners, reinforcing ribs and cover. Each cover provides load cell protection, standard fork tip functionality, a load bearing surface and a structure that interfaces through spacers with the load cells to provide load weight readings to an operator. Each fork cover is affixed through spacers to the load cells which are in turn affixed through spacers to each fork. The tip section from each standard fork is cut off, modified and welded flush to the front end of each fork cover, providing functionality for normal lift truck operations.

As various approaches in prior art address certain problems but not others, it is a prime objective of this invention to more fully address the range of problems that relate to the application of this type of equipment, within the scope of this invention.

A feature of this invention is the use of standard lift truck forks that minimize custom manufactured components and reduce manufacturing costs.

Another feature of this invention is that because standard forks are employed, modifications to the lift truck or additional attachment components are not required making installation easier. Further, the standard nature and simplicity of design allow servicing by regular technicians without highly specialized knowledge and the option of servicing onsite.

Another feature of this invention is that it provides protection to load cells against vertical and lateral overloading and accomplishes this through simple component spacing, fastener tensioning and with only a few basic components.

Another feature of this invention is that weighing functions can be performed with the forks in the fully lowered position and as a result, load weight can be safely checked relative to the maximum lifting capacity of the lift truck before attempting to lift the load thus avoiding potential injury to the operator and damage to the lift truck.

Another feature of this invention is that because additional attachment components such as a secondary carriage for mounting the forks are not required, the position of the forks is kept safely at the distance from the lift truck specified by the manufacturer, thus maintaining proper balance between the forks and the truck for lifting and weighing functions.

Another feature of this invention is that the low profile and uniform top surface of the forks allow easy access to standard pallets.

Another feature of this invention is that the load cells are electronically matched to give accurate weight data regardless of the positioning of a load on the forks.

Another feature of this invention is that the cover completely surrounding the top and sides of the fork and load cell subassembly, minimizing contamination by foreign substances and shielding the subassemblies from direct impact.

DESCRIPTION OF THE DRAWINGS

FIG. 2a is a top view of the fully assembled weigh sensed lift truck fork with cover attached.

FIG. 2b is a top view of the assembled weigh sensed lift truck fork without cover.

DETAILED DESCRIPTION OF THE INVENTION

Figure 1:
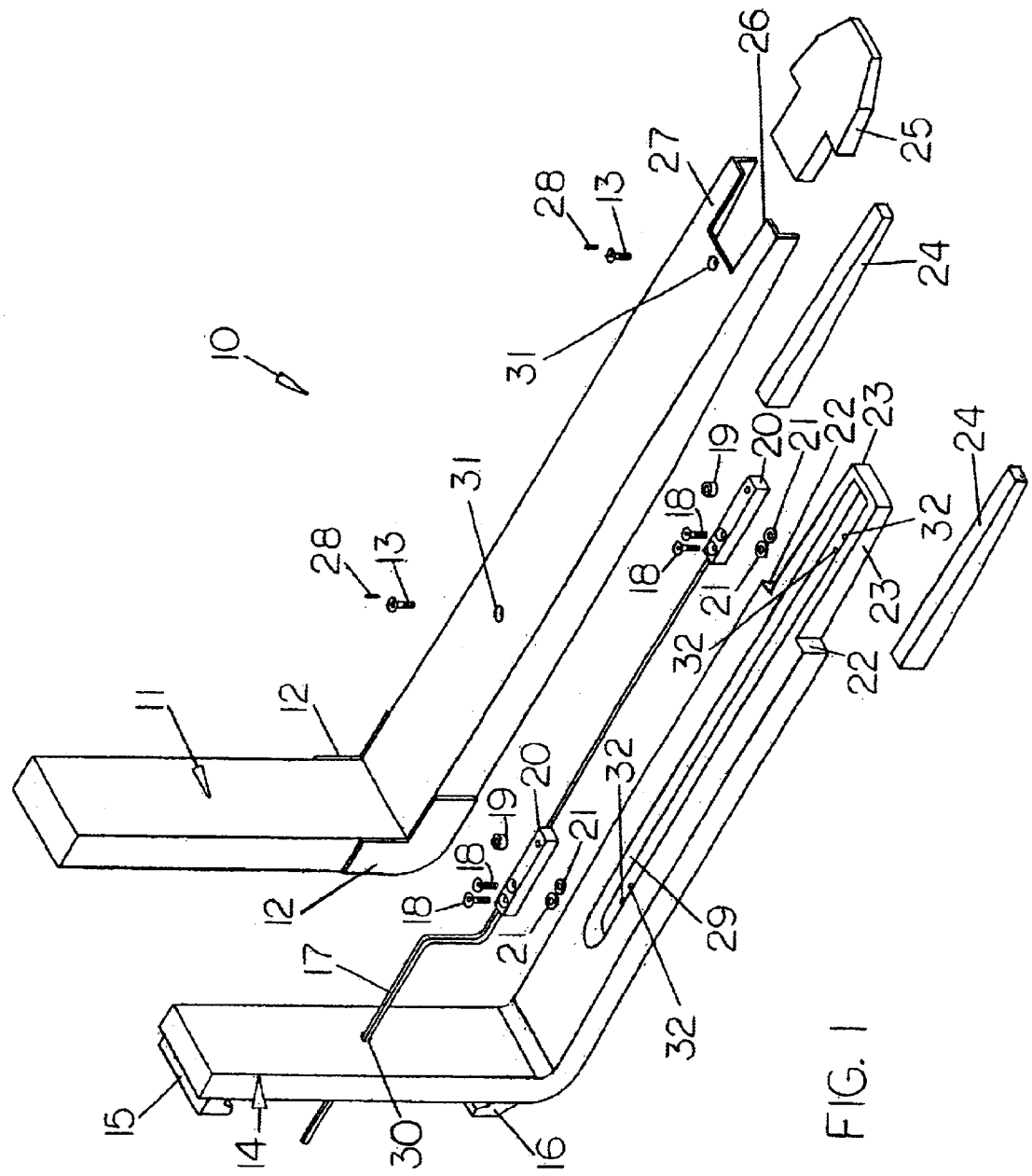
FIG. 1 is an exploded view of the weigh sensed lift truck fork embodying this invention and showing all components in its design.
Figure 3:
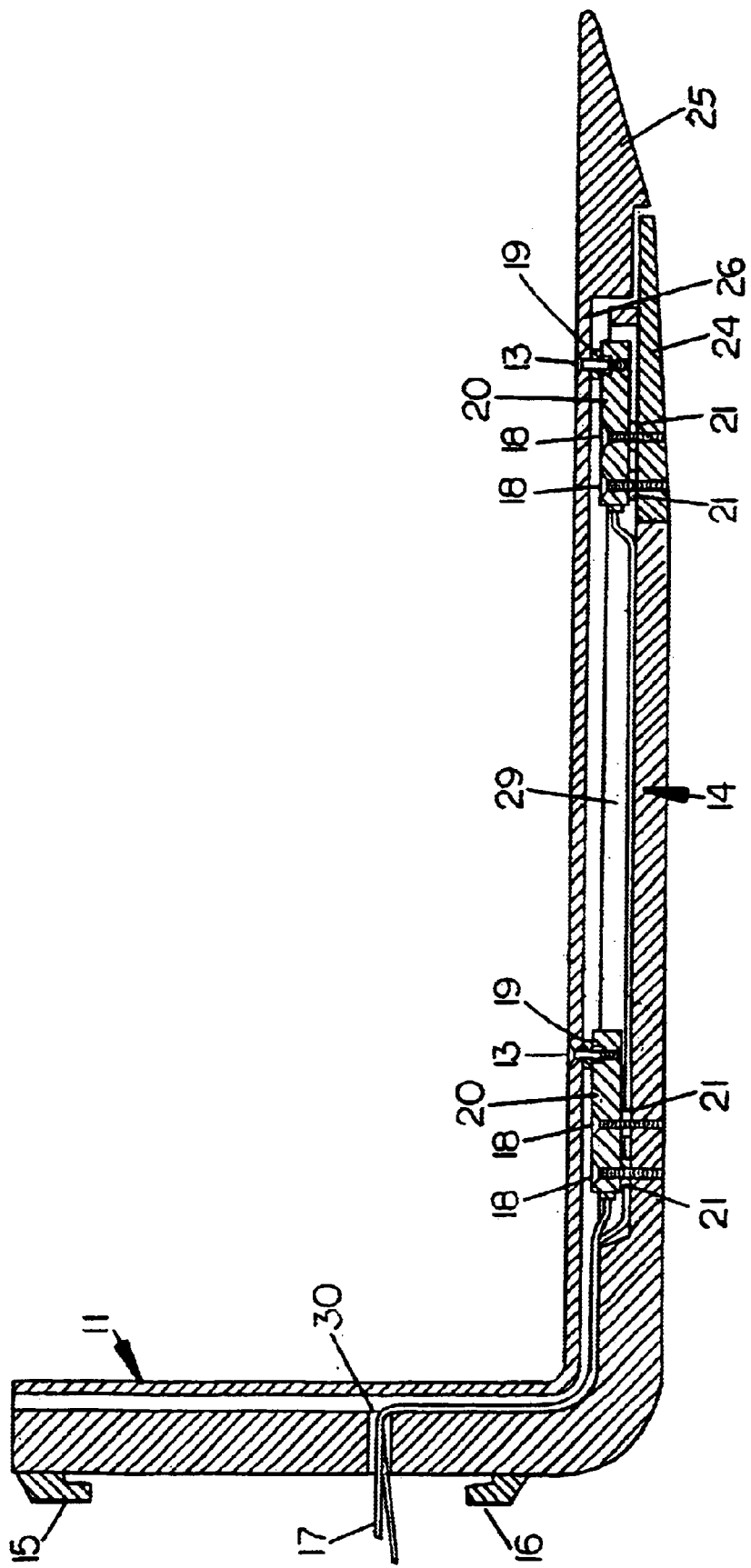
FIG. 3 is a sectional view of the weigh sensed lift truck fork showing the complete assembly.

Illustrated in FIGS. 1–4b is a weigh sensed lift truck fork 10 embodying this invention in the exemplary configuration. FIG. 1 illustrates a weigh sensed lift truck fork 10 depicting all components and features of the invention assembly typically used in pairs. A load bearing cover 11 responsive to load weight, with welded reinforcing brackets 12 on the side walls of its rear heel, countersunk bolt holes 31 positioned along the center line of its length and a cover notch 26 at its front end is shown in FIGS. 1 and 2a. Cover tip 25, fabricated from the removed and modified front tip of standard fork 14, is welded into cover notch 26 flush with cover surface 27 as shown in FIGS. 1, 2a and 3. Modification of the front tip removed from standard fork 14 for attachment at cover notch 26 to form cover tip 25 entails the removal of rear sections at each side of the front tip. This removal of the said sections leaves recessed faces along the rear vertical edges of cover tip 25 to match and fit the shape of cover notch 26 as shown in FIG. 1. The remaining front end of fork 14 is further modified to interface with cover tip 25. This is done by the removal of side sections leaving recessed faces 22 and 23 along the front vertical edges of fork 14 to which reinforcing ribs 24 are welded flush as shown in FIGS. 1, 2b and 3. Reinforcing ribs 24 provide structural reinforcement to cover 11 and cover tip 25 where they extend past the remaining front end of fork 14 as shown in FIGS. 2b and 3. The cover 11 is attached by countersunk flathead bolt fasteners 13 fitted through countersunk bolt holes 31 through spacers 19 positioned immediately underneath cover 11 and into the threaded hole in the flexing end of load cells 20. The non-flexing end of load cells 20 is tightly attached by countersunk flathead bolt fasteners 18 fitted through spacers 21 positioned immediately below load cells 20 into threaded holes 32 positioned along the centerline of machined channel 29 centered in the top surface of fork 14. To provide limited space for the downward bending action of the flexing end of load cells 20 when subjected to load weight, spacers 19 position the top surface of load cells 20 relative to the underside of cover 11 and spacers 21 position the bottom surface of load cells 20 relative to the bottom surface of channel 29.

Invention assembly 10 can be mounted in the typical manner of lift truck forks in pairs onto a standard fork mounting carriage of a commercially available lift truck by means of upper bracket 15 and lower bracket 16 welded to the outside vertical back wall of fork 14. This can be done without modification or additional components such as a secondary carriage facilitating ease of installation and servicing and proper positioning and balance between invention assembly 10 and a lift truck, thus improving safety during lifting, weighing and transport functions. Load cells 20 are electrically interconnected by wiring 17 that is routed through channel 29 to a commercial display in a lift truck through hole 30 in the upright portion of fork 14.

Lifting and transport functions of this invention illustrated in FIGS. 1–4b can be performed in the same manner as with typical standard forks used on commercially available lift trucks while also maintaining load weighing functionality because the design of this invention is based on a standard lift truck fork. However, arrangements of forks with load weighing functionality using a full unmodified fork with a full cover completely enclosing the top and side surfaces of the fork right to its tip become vertically too high with overlapping components, especially at the tip, to allow easy access under a typical standard pallet or a load with limited access space. In such arrangements, the cover has to extend past the fork tip, vertically and horizontally tapering towards the front end to achieve the slender profile of the fork tip itself. As the cover construction would not have the body mass to provide the required structural integrity of the fork tip, standard fork functionality would not be achieved. The frontal section of such arrangements would either be too vertically thick for easy access under standard pallets and limited spaces or structurally too weak for adequate load support, especially when engaged in the common practice of maneuvering a load position with the cover tips. Therefore this invention integrates the modified front tip removed from standard fork 14 with cover 11 and utilizes reinforcing ribs 24 to address these problems while still maintaining load weighing capability of the invention. The recessed faces 22 and 23 along the front vertical edges of fork 14 provide the attachment positions for reinforcing ribs 24. These ribs reinforce structural integrity at and past the remaining front end of the fork 14 and compensate for the removal of the fork's front tip to be utilized as cover tip 25. Integration of a standard lift truck fork tip with cover 11 provides a standard fork tip profile and functionality to cover 11.

The low profile of the load bearing surface of invention assembly 10 and the uniform cover surface 27 as illustrated in FIG. 3 enhances easy and unobstructed access of the load bearing surface under a typical standard pallet or load with limited access space.

Figure 4A:
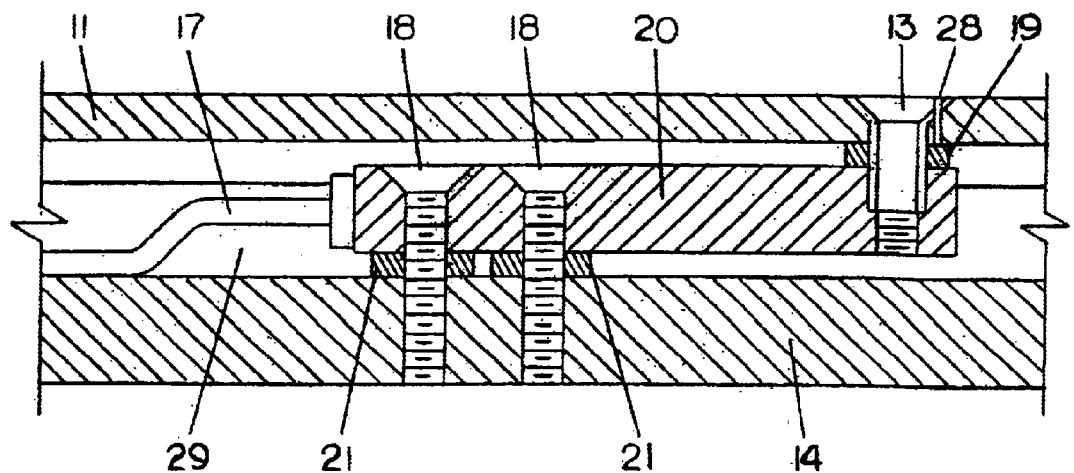
FIG. 4a is an enlarged fragmentary view of a weigh sensed lift truck fork load cell subassembly at rest.
Figure 4B:
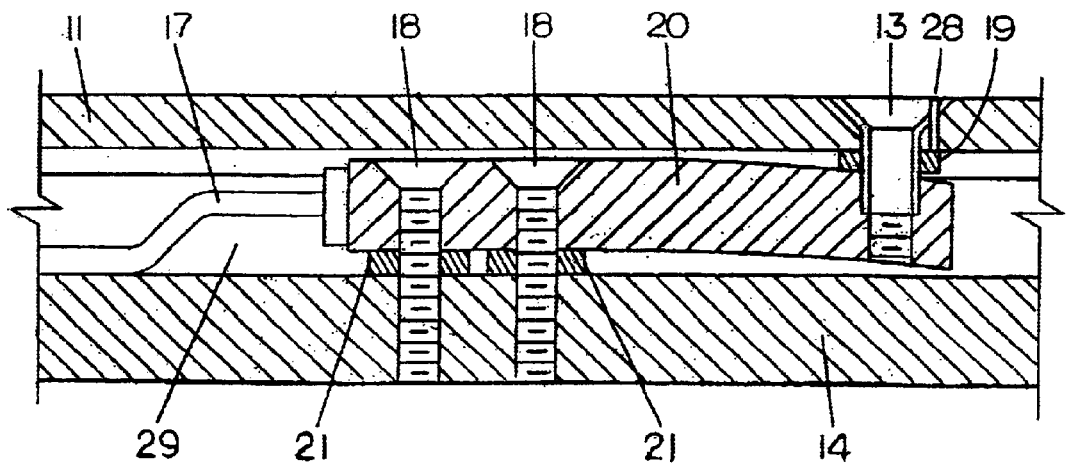
FIG. 4b is an enlarged fragmentary view of a weigh sensed lift truck fork load cell subassembly under load.

Load weight readouts are sent to a commercial display mounted appropriately in a lift truck. When weight is place on cover 11, cover 11 depresses, bending the flexing end of load cells 20 spaced above the bottom surface of channel 29 as shown in FIGS. 4a and 4b downward regardless of fork height to send a weight signal through wiring 17 to said display. The non-critical fork height position for weight measurement allows a load to be weighed with forks in the fully lowered position, facilitating safe load weight measurement relative to the weight lifting capacity of the lift truck before the forks are raised. Vertical overload protection of load cells 20 from excessive load weight is achieved because the flexing end of the load cells vertically positioned above channel 29 by spacers 21 will bottom out on the bottom surface of channel 29 before load weight exceeds their functional limit. When this happens, load cells 20 will not flex further and will move with fork 14 as a whole. Lateral overload protection of load cells 20 from excessive lateral forces is achieved firstly by not fully tightening countersunk flathead bolt fasteners 13 as shown in FIGS. 4a and 4b. Secondly, the said lateral overload protection is achieved by the spacing provided between any adjacent faces of cover 11, countersunk flathead bolt fasteners 13, spacers 19, load cells 20, fork 14, cover tip 25 and reinforcing ribs 24 as shown in FIGS. 3, 4a, and 4b. This spacing allows lateral movement between cover 11 with integral cover tip 25 and load cells 20, fork 14 and reinforcing ribs 24. Further, each countersunk flathead bolt fastener 13 has an unthreaded shoulder as shown in FIGS. 4a and 4b that flexes within the space around it when invention assembly 10 is subjected to significant lateral force. Lateral overloading from the front of invention assembly 10 is prevented when the rear vertical surface of cover tip 25 bottoms out against the front vertical surface of fork 14 before the force applied to the front of cover tip 25 exceeds the functional limits of load cells 20. Lateral overloading from the side of invention assembly 10 is prevented when the rear side vertical surface of cover tip 25 bottoms out against the inside vertical surfaces of reinforcing ribs 24 where they extend past the remaining front end of fork 14 before the force applied to either side of cover 11 exceeds the functional limit of load cells 20.

Binding between said components of invention assembly 10 that could affect the accuracy of load weight signals sent to an attached load weight display is prevented by the said spacing between these components and by not fully tightening countersunk flathead bolt fasteners 13.

Further loosening of the countersunk flathead bolt fasteners 13 is prevented by tension pins 28. A tension pin is driven into a hole drilled into the head of each countersunk flathead bolt fastener 13 and then through an aligned hole in cover 11 to create a locking configuration as shown in FIGS. 4a and 4b. Full top and side coverage of fork 14 is provided by cover 11 that completely encloses the top and side surfaces of the fork. This enhances protection of load cells 20 from the impact of excessive forces, reduces contamination by foreign substances that could further cause binding between the invention assembly components and maximizes the functional load weighing surface of cover 11. Further, the extensive coverage provided by cover 11 over fork 14 in conjunction with load cells 20 that are electronically matched to address variations in weight readings because of irregularly configured loads, make load positioning on cover surface 27 non-critical for accurate weight measurement.

What is claimed is:

1. Weigh sensed lift truck forks used in pairs, each half of said pair comprising:
   (a) a standard fork as used on lift trucks with its tip removed, the said standard fork being further modified to provide attachment positions for reinforcing ribs that extend past the remaining front end of said standard fork;
   (b) A load bearing cover with the modified tip removed from said standard fork affixed into a notch in the front end of said cover, the said cover being responsive to load weight thereon and lateral forces and providing the required full top and side surface coverage of said standard fork;
   (c) at least one electronically matched load cell having an end that flexes in response to weight resulting from a load being positioned on the top surface of said cover to which said load cell is attached;
   (d) fastener attaching flexing end of said load cell to underside of said cover;
   (e) fasteners attaching non-flexing end of said load cell to said standard fork; and
   (f) spacers through which said fasteners align, positioning the top surface of the flexing end of said load cell relative to the underside of said cover and, the non-flexing end of said load cell relative to said standard fork.

2. Weigh sensed lift truck forks according to claim 1 wherein said standard fork is modified with a machined channel along the center of its top surface into which said load cell is tightly affixed at its non-flexing end to the bottom surface of said channel having said spacers that provide limited bending space for the flexing end of the said load cell positioned between the underside of said load cell and the bottom surface of said channel.

3. Weigh sensed lift truck forks according to claim 2 wherein the positioning of said load cell above the bottom surface of said channel by means of said spacers allows room for downward bending action of flexing end of said load cell to provide weight sensing capability when said load cell is subjected to load weight regardless of the height of said standard fork.

4. Weigh sensed lift truck forks according to claim 3 wherein said the positioning of said load cell with said spacers ensures the flexing end of said load cell will bottom out on bottom surface of said channel to prevent further flexing of said load cell before load weight exceeds the functional limit of said load cells, thus providing vertical overload protection.

5. Weigh sensed lift truck forks according to claim 1 wherein said load cell is electrically connected to an appropriately mounted commercial display, sending a weight signal to such display during flexure of said load cell in response to a load weight positioned on the top surface of said cover, thus providing load weighing capability to said standard fork.

6. Weigh sensed lift truck forks according to claim 1 wherein the front tip of said standard fork is removed and modified for fitting into a notch in the front end of said cover by the removal of side sections leaving recessed faces along the rear vertical edges of said front tip, after which said front tip is affixed to the notch in the front end of said cover in a flush manner, forming a cover and cover tip that allows standard lift truck fork functionality while maintaining the load weighing capability of the invention.

7. Weigh sensed lift truck forks according to claim 6 wherein the remaining front end of said standard fork after the removal of said front tip, is further modified to interface with said cover tip by the removal of side sections leaving recessed faces along the front vertical edges of said standard fork to which reinforcing ribs are affixed in a flush manner, the said ribs providing structural reinforcement for said cover and cover tip where they extend past the remaining front end of said standard fork.

8. Weigh sensed lift truck forks according to claim 1 wherein said fastener attaching the flexing end of said load cell to said cover is not fully tightened and spacing is provided between any adjacent faces of said fastener, said spacer, said cover, said load cell, said fork, said cover tip and said reinforcing ribs allowing enough lateral movement between said components to provide lateral overload protection of said load cell when subjected to excessive lateral forces.

9. Weigh sensed lift truck forks according to claims 7 or 8 wherein the rear vertical surface of said cover tip and the front vertical surface of said standard fork are adjacent and will bottom out against each other before force applied to the front of said cover tip exceeds the functional limit of said load cells, thus providing further lateral overload protection from the front.

10. Weigh sensed lift truck forks according to claims 7 or 8 wherein the rear side vertical surface of said cover tip and inside vertical surfaces of said reinforcing ribs are adjacent and will bottom out against each other before force applied to either side of said cover exceeds the functional limit of said load cells, thus providing further lateral overload protection from the side.

11. Weigh sensed lift truck forks according to claim 8 wherein said spacing between said fastener, said spacer, said cover and upper portion of flexing end of said load cell prevents binding between the said assembly components that could adversely affect the readout accuracy of an attached load weight display.

12. Weigh sensed lift truck forks according to claim 8 wherein a tension pin is driven into aligned holes, one hole made through the head of said fastener and one hole made through the adjacent surface of said cover, thus creating a locking configuration and preventing further loosening of said partially tightened fastener that attaches the flexing end of said load cell to said cover.

13. Weigh sensed lift truck forks according to claim 1 wherein the said cover completely encloses the top and side surfaces of the said standard fork, maximizing the functional load weighing surface, increasing protection of internal assembly components from excessive loads and forces, and, in conjunction with electronically matched said load cell, making load positioning on the surface of said cover non-critical for accurate load weight measurement.

14. Weigh sensed lift truck forks according to claim 1 wherein said standard fork has upper and lower brackets affixed to its rear vertical face by which it attaches in a typical manner in pairs to a lift truck without the need for modifications or additional attachment components such as a secondary carriage, thus allowing proper positioning and balance between said standard fork and said lift truck, and improving safety during lifting, weighing and transport functions.

15. Weigh sensed lift truck forks according to claim 1 wherein the low profile of the load bearing surface of the invention assembly, facilitated by the integration of the said fork tip into the said cover, and the uniform surface of said cover enhance easy access of the load bearing surface under a typical standard pallet and loads with limited access space while still maintaining the load weighing capability of the invention.

\* \* \* \* \*